US012413909B2

(12) United States Patent
Xu et al.

(10) Patent No.: US 12,413,909 B2
(45) Date of Patent: Sep. 9, 2025

(54) PACKAGE STRUCTURE OF MICRO SPEAKER

(71) Applicant: Fortemedia, Inc., Alviso, CA (US)

(72) Inventors: Yu-Xuan Xu, Hsinchu (TW); Shih-Chin Gong, Taipei (TW)

(73) Assignee: FORTEMEDIA, INC., Alviso, CA (US)

( * ) Notice: Subject to any disclaimer, the term of this patent is extended or adjusted under 35 U.S.C. 154(b) by 253 days.

(21) Appl. No.: 18/302,207

(22) Filed: Apr. 18, 2023

(65) Prior Publication Data

US 2024/0357294 A1 Oct. 24, 2024

(51) Int. Cl.

| | |
|---|---|
| ***H04R 7/04*** | (2006.01) |
| ***H04R 1/02*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ............... *H04R 7/04* (2013.01); *H04R 1/025* (2013.01); *H04R 9/025* (2013.01); *H04R 9/047* (2013.01); *H04R 9/06* (2013.01); *H04R 2201/003* (2013.01)

(58) Field of Classification Search

CPC ... B81B 7/0019; B81B 7/0061; B81B 7/0087; B81B 3/0081; B81B 2201/0264; B81B 2207/012; B81B 2207/015; B81B 2203/0127; B81B 2201/0257; H04R 19/04; H04R 19/005; H04R 1/04; H04R 2201/003; H04R 2410/03; H04R 7/02; H04R 31/00; H04R 7/18; B81C 1/0069

See application file for complete search history.

(56) References Cited

U.S. PATENT DOCUMENTS

| | | | | |
|---|---|---|---|---|
| 2006/0056651 A1* | 3/2006 | Yao | H04R 9/048 381/399 |
| 2012/0104521 A1* | 5/2012 | Higashi | G01L 9/0042 257/419 |
| 2012/0131792 A1* | 5/2012 | Tseng | H01F 41/046 29/602.1 |
| 2016/0021459 A1* | 1/2016 | Inoue | B81B 7/0006 381/174 |
| 2018/0132023 A1* | 5/2018 | Yoo | H04R 1/04 |
| 2019/0116427 A1* | 4/2019 | Inoue | B81B 3/0072 |
| 2020/0055726 A1* | 2/2020 | Deas | B81B 7/0019 |
| 2020/0196049 A1* | 6/2020 | Zhang | H04R 9/022 |
| 2020/0344551 A1* | 10/2020 | Chen | H05K 1/181 |
| 2021/0160619 A1* | 5/2021 | Shymanovych | H04R 1/1008 |

* cited by examiner

*Primary Examiner* — Carolyn R Edwards
*Assistant Examiner* — Julie X Dang
(74) *Attorney, Agent, or Firm* — McClure, Qualey & Rodack, LLP

(57) ABSTRACT

A package structure of a micro speaker is provided, and includes a substrate, a membrane, a coil, and a magnetic element. The substrate has a hollow chamber. The membrane is disposed on the substrate and covers the hollow chamber. The coil is embedded in the membrane. The magnetic element is disposed in the hollow chamber. A vent hole is formed in and penetrates the membrane, and the vent hole is separated from the coil and communicates with the hollow chamber.

20 Claims, 15 Drawing Sheets

PACKAGE STRUCTURE OF MICRO SPEAKER

BACKGROUND OF THE DISCLOSURE

Field of the Disclosure

The present disclosure relates to a micro speaker, and, in particular, to a package structure of a micro speaker including a membrane having a straight edge and a vent hole.

Description of the Related Art

Since electronic products are being developed to be smaller and thinner, how to scale down the size of these electronic products is an important topic. The micro electromechanical system (MEMS) technique is a technique for effectively scaling down the size of elements. The concept of the MEMS technique is to combine semiconductor process techniques and precision micromachining techniques, and to manufacture micro elements and micro systems with multiple functions. However, there is still room for improvement of micro speakers using the MEMS technique.

BRIEF SUMMARY OF THE DISCLOSURE

An embodiment of the present invention provides a package structure of a micro speaker, which includes a substrate, a membrane, a coil, and a magnetic element. The substrate has a hollow chamber. The membrane is disposed on the substrate and covers the hollow chamber. The coil is embedded in the membrane. The magnetic element is disposed in the hollow chamber. A vent hole is formed in and penetrates the membrane, and the vent hole is separated from the coil and communicates with the hollow chamber.

An embodiment of the present disclosure provides package structure of a micro speaker, which includes a substrate, a membrane, a coil, and a magnetic element. The substrate has a hollow chamber. The membrane is disposed on the substrate and covers the hollow chamber. The membrane has at least one straight edge. The coil is embedded in the membrane. In addition, the magnetic element is disposed in the hollow chamber.

In addition, an embodiment of the present disclosure provides package structure of a micro speaker, which includes a substrate, a membrane, a coil, and a magnetic element. The substrate has a hollow chamber. The membrane is disposed on the substrate and covers the hollow chamber. The membrane has at least one straight edge. The coil is embedded in the membrane. In addition, the magnetic element is disposed in the hollow chamber. A vent hole is formed in and penetrates the membrane, and the vent hole is separated from the coil and communicates with the hollow chamber.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The package structures of the micro speaker of some embodiments of the present disclosure are described in the following description. However, it should be appreciated that the following detailed description of some embodiments of the disclosure provides various concepts of the present disclosure which may be performed in specific backgrounds that can vary widely. The specific embodiments disclosed are provided merely to clearly describe the usage of the present disclosure by some specific methods without limiting the scope of the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

Figure 1:
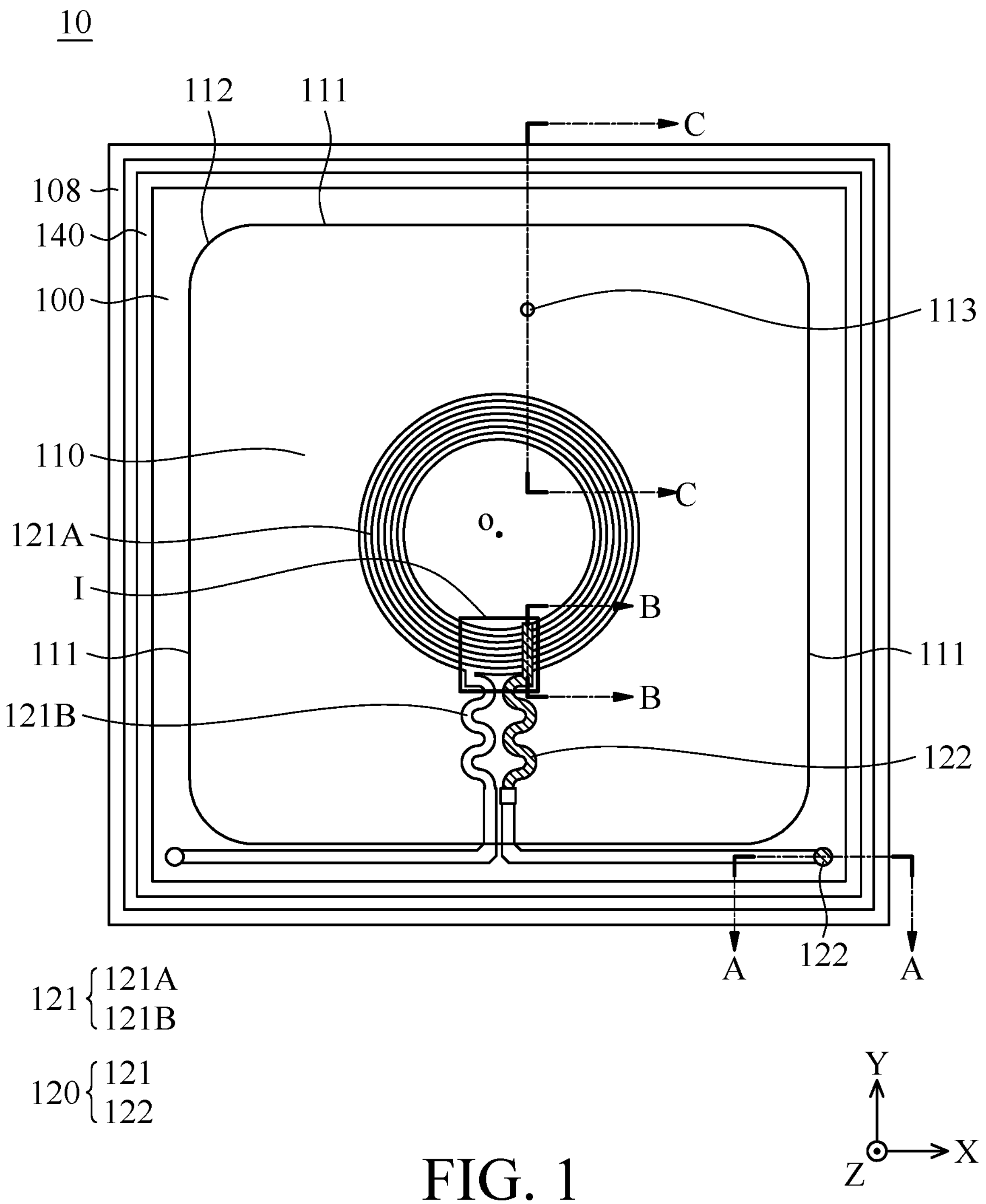
FIG. 1 is a schematic top view illustrating a package structure of a micro speaker in accordance with some embodiments of the present disclosure.

FIG. 1 is a top view illustrating a package structure 10 of a micro speaker in accordance with some embodiments of the present disclosure. As shown in FIG. 1, the package structure 10 of the micro speaker includes a substrate 100, a membrane 110, a multi-layered coil 120, and a lid 108. Referring to FIG. 1, the membrane 110 is disposed on the substrate 100 and can vibrate up and down in the normal direction (such as the Z-axis) of the substrate 100. It should be noted that the lid 108 is briefly shown and the top of the lid 108 is hidden to clearly show the interior structure of the package structure 10 of the micro speaker.

In some embodiments, the membrane 110 has at least straight edge. For example, the membrane 110 may be shaped like a rectangle, a rounded rectangle, a polygon, a rounded polygon, or another regular or irregular shape, when viewed from a top view. More specifically, the membrane 110 has a plurality of edges 111 and a plurality of corners 112, and each of the corners 112 is connected between two adjacent edges 111. Accordingly, compared to a conventional circular membrane, the membrane 110 may have more surface area under the same chip size, and therefore may achieve a higher sound pressure level and better performance (for example, higher sensitivity) than the conventional design.

In addition, at least one vent hole 113 is formed in and penetrates the membrane 110. The vent hole 113 is shown to penetrate the membrane 110 in the normal direction of the substrate 100. However, other directions are also possible and included within the scope of the present disclosure. In some embodiments, the vent hole 113 is separated from the multi-layered coil 120 in a top view. As a result, the vent hole 113 may not make negative impact to the operation of the multi-layered coil 120. The vent hole 113 may connect the front side of the membrane 110 and the back side of the membrane 110, and therefore the pressure of two sides is balanced via the vent hole 113. Therefore, better user experience may be provided, and the reliability of the speaker may also be increased. For example, the vent hole 113 may reduce the defect (such as leakage, which may be referred to as "roll-off") occurred in the low frequency range. In some embodiments, the diameter of the vent hole 113 is between about 1 μm and about 100 μm. However, the present disclosure is not limited thereto. In some embodiments, the vent hole 113 may have non-circular shape, and the length and/or width of the vent hole 113 is between about 1 μm and about 100 μm.

The multi-layered coil 120 is embedded in the membrane 110. That is, the multi-layered coil 120 is not actually exposed from the top surface of the membrane 110 in the top view. For the purpose of illustration, the multi-layered coil 120 is shown in the present disclosure. The multi-layered coil 120 is configured to transmit electrical signals and drive the membrane 110 to deform relative to the substrate 100 according to the electrical signals.

In some embodiments, the multi-layered coil 120 includes a first metal layer 121 and a second metal layer 122. The first metal layer 121 is electrically connected to the second metal layer 122 in an opening 110E of the membrane 110 to transmit electrical signals and control the operation of the package structure 10 of the micro speaker. In some embodiments, the first metal layer 121 includes a spiral structure 121A located in the center of the membrane 110 and a wavy structure 121B extending from the spiral structure 121A to the periphery of the membrane 110. The spiral structure 121A surrounds the central axis O of the membrane 110, and the wavy structure 121B connects the spiral structure 121A to the opening 110E. By providing the wavy structure 121B, the membrane 110 can be more flexible and the difficulty of vibration can be reduced.

Figure 2:
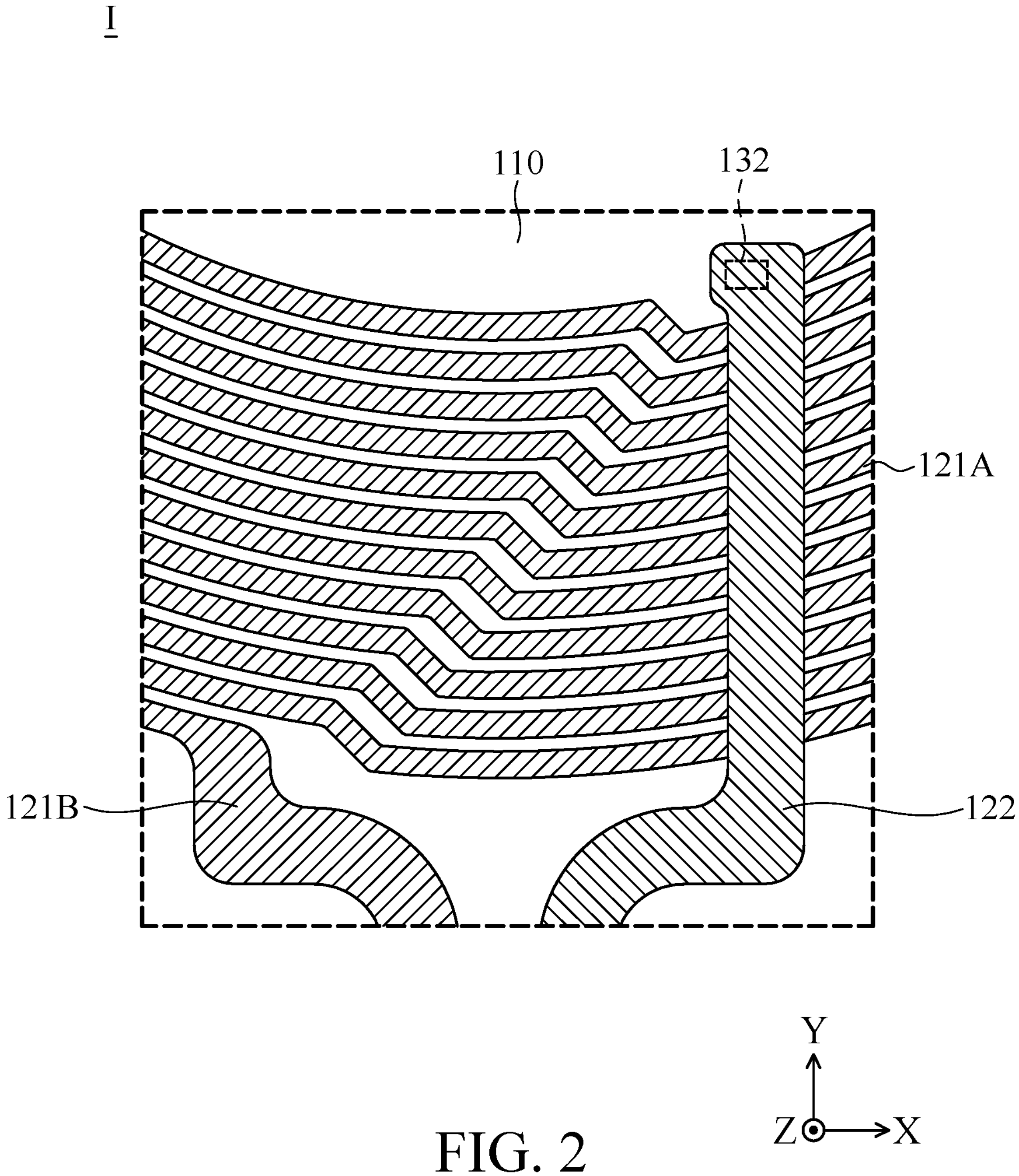
FIG. 2 is a schematic enlarged view illustrating a region I shown in FIG. 1 in accordance with some embodiments of the present disclosure.

FIG. 2 is a schematic enlarged view illustrating the region I shown in FIG. 1 in accordance with some embodiments of the present disclosure. Referring to FIG. 2, the first metal layer 121 and the second metal layer 122 are located on different levels, and the second metal layer 122 is higher than the first metal layer 121. That is, the second metal layer 122 is closer to the top of the membrane 110 than the first metal layer 121.

In some embodiments, a dielectric layer 130 is disposed between the first metal layer 121 and the second metal layer 122 to prevent a short circuit between the first metal layer 121 and the second metal layer 122. A via hole 132 is formed in the dielectric layer 130. The second metal layer 122 crosses the spiral structure 121A and is electrically connected to the first metal layer 121 through the via hole 132.

The process of manufacturing the package structure 10 is described in detail below in conjunction with FIGS. 3A to 3F.

FIGS. 3A to 3F show schematic cross-sectional views of the package structure 10 shown in FIG. 1 during the manufacturing process. It should be understood that each of FIGS. 3A to 3F includes a cross-sectional view along the lines A-A, B-B, and C-C shown in FIG. 1. The manufacturing processes of different parts (for example, the parts along the lines A-A, B-B, and C-C) of the package structure 10 are shown in a single figure for those skilled in the art to understand easily.

Figure 3A:
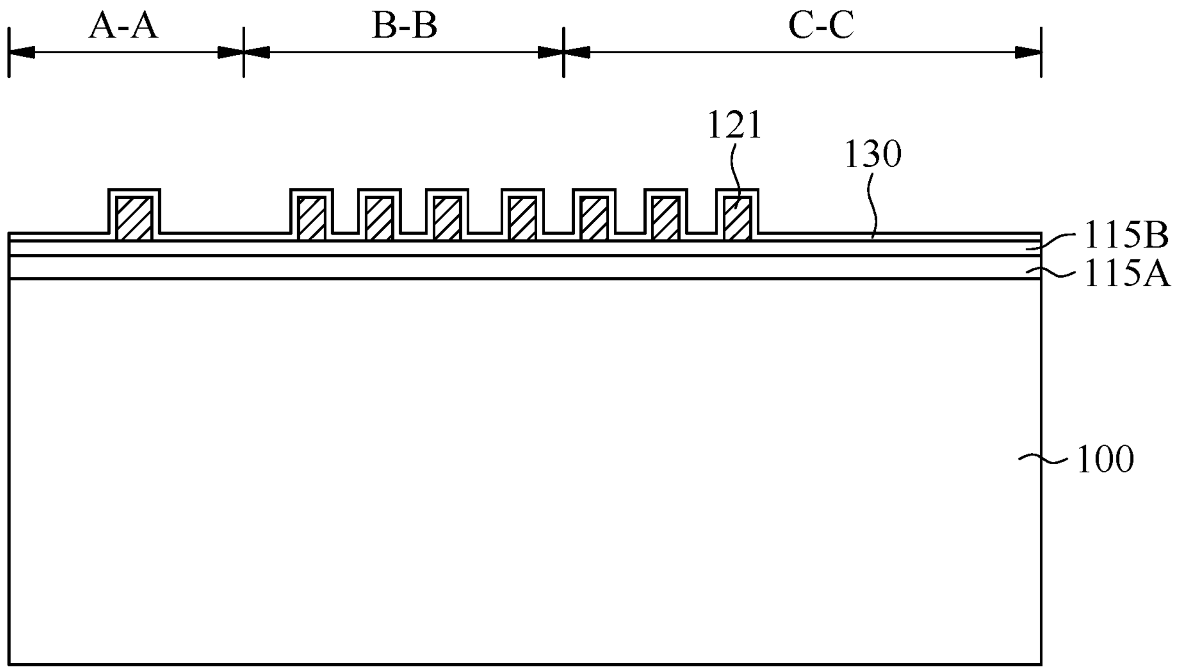
FIGS. 3A-3F are schematic cross-sectional views illustrating manufacturing processes of the package structure of the micro speaker shown in FIG. 1.

Referring to FIG. 3A, a plurality of dielectric layers 115A and 115B are formed on the substrate 100. In some embodiments, the substrate 100 may be part of a semiconductor wafer. In some embodiments, the substrate 100 may be formed of silicon (Si) or other semiconductor materials. Alternatively or additionally, the substrate 100 may include other element semiconductor materials, such as germanium (Ge); a compound semiconductor, such as silicon carbide (SiC), gallium arsenide (GaAs), indium arsenide (InAs), indium phosphide (InP); and an alloy semiconductor, such as silicon germanium (SiGe), silicon germanium carbide (SiGeC), gallium arsenide phosphide (GaAsP), indium gallium phosphide (InGaP). In some embodiments, the thickness of the substrate 100 may be between about 100 μm and about 1000 μm. However, the present disclosure is not limited thereto.

In some embodiments, the dielectric layer 115A may be silicon dioxide ($SiO_2$) or other oxides or nitrides that can be used as a dielectric layer. The dielectric layer 115A may be formed on the substrate 100 through thermal oxidation, chemical vapor deposition (CVD), low pressure CVD (LPCVD), atmospheric pressure CVD (APCVD), plasma-enhanced chemical vapor deposition (PECVD), or a combination thereof.

In some embodiments, the dielectric layer 115B may be silicon dioxide ($SiO_2$) or other oxides or nitrides that can be used as a dielectric layer. The dielectric layer 115B may be formed on the dielectric layer 115A through thermal oxidation, chemical vapor deposition (CVD), plasma-enhanced chemical vapor deposition (PECVD), or a combination thereof. It is noted that although two dielectric layers 115A and 115B are shown in the present embodiments, less or more dielectric layers may be provided in other embodiments, and these configurations are within the scope of the present disclosure.

Still referring to FIG. 3A, the first metal layer 121 of the multi-layered coil 120 is formed on the dielectric layer 115B. The first metal layer 121 may be formed through electroplating or physical vapor deposition (PVD), such as sputtering or evaporation coating. Then, the first metal layer 121 is patterned to form the spiral structure 121A and the wavy structure 121B as shown in FIG. 1. The patterning process may include photolithography processes (for example, photoresist coating, soft baking, mask alignment, exposure, post-exposure baking, photoresist development, other suitable processes or a combination thereof), etching processes (for example, wet etching process, dry etching process, other suitable processes or a combination thereof), other suitable processes, or a combination thereof.

In some embodiments, the first metal layer 121 may include aluminum silicon, aluminum, copper, or a combination thereof. In some embodiments, the width of the first metal layer 121 may be between about 1 μm and about 500 μm, and the thickness of the first metal layer 121 may be between about 0.1 μm and about 20 μm. However, the present disclosure is not limited thereto.

Still referring to FIG. 3A, a dielectric layer 130 is formed on the first metal layer 121 and the dielectric layer 115B. In some embodiments, the dielectric layer 130 may be formed through a furnace process or a chemical vapor deposition process. In some embodiments, the dielectric layer 130 may be carbon-doped oxides or other suitable insulating materials.

Figure 3B:
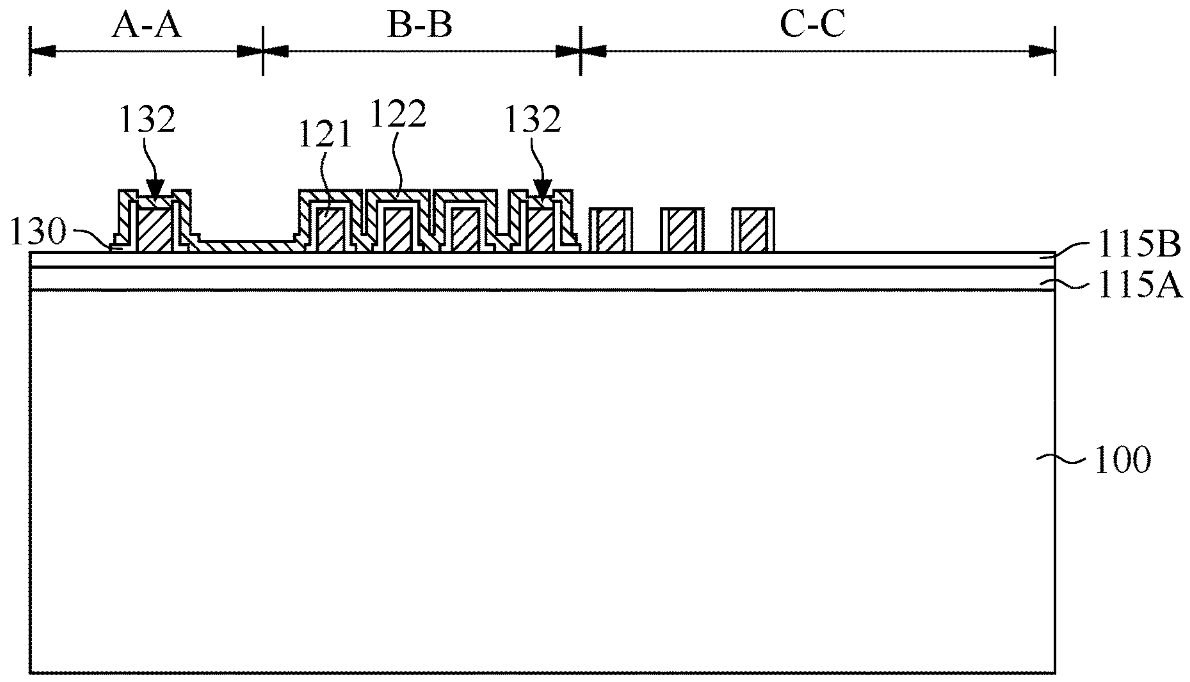

Referring to FIG. 3B, a lithography process and an etching process are performed on the dielectric layer 130 to form a via hole 132 in the dielectric layer 130 and expose a portion of the first metal layer 121. Then, the second metal layer 122 of the multi-layered coil 120 is formed on the dielectric layer 130 and the first metal layer 121 through electroplating or physical vapor deposition (for example, sputtering or evaporation coating). The second metal layer 122 is subsequently patterned. It should be noted that the dielectric layer 130 is cut into separate segments through the lithography process and etching process, leaving only the necessary portion to insulate the first metal layer 121 and the second metal layer 122. By removing unnecessary portion of the dielectric layer 130, the membrane 110 can be more flexible and thus improve the performance of the package structure.

In some embodiments, the second metal layer 122 may include aluminum silicon, aluminum, copper, or a combination thereof. In some embodiments, the width of the second metal layer 122 may be between about 1 μm and about 500 μm, and the thickness of the second metal layer 122 may be between about 0.1 μm and about 20 μm. However, the present disclosure is not limited thereto.

Figure 3C:
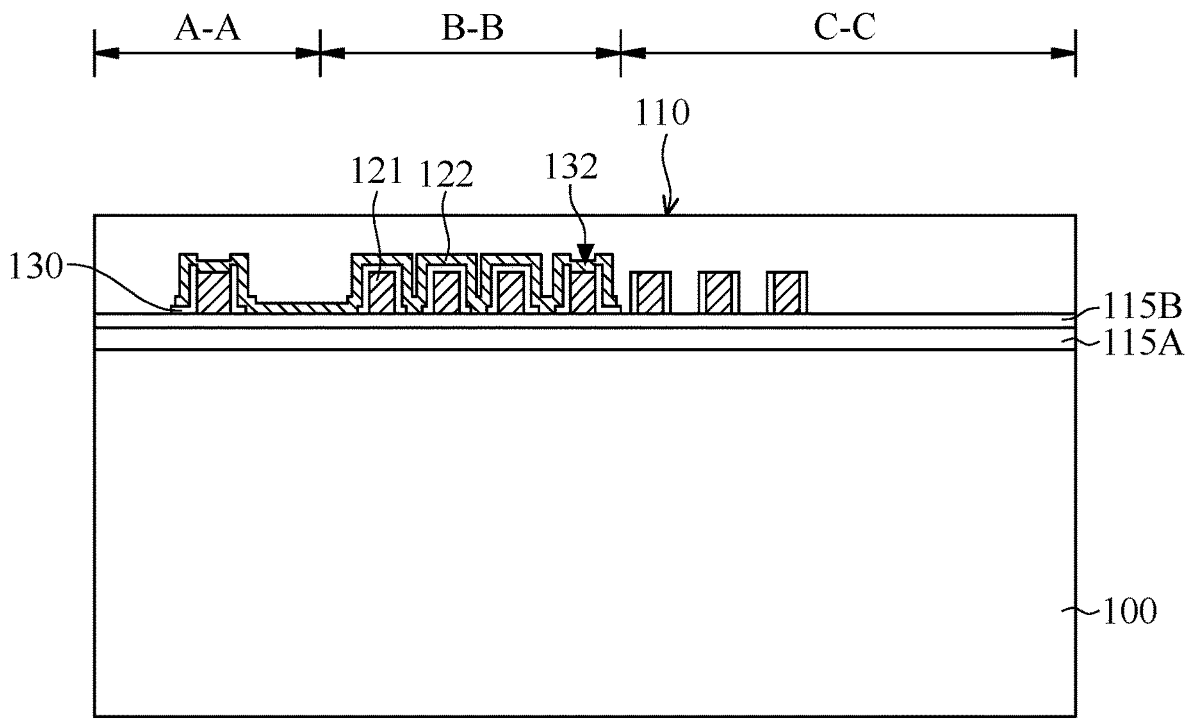

Referring to FIG. 3C, the membrane 110 is formed on the second metal layer 122. In some embodiments, the membrane 110 may be formed through spin coating, slot-die coating, blade coating, wire bar coating, gravure coating, spray coating, chemical vapor deposition, other suitable methods, or a combination thereof. As shown in FIG. 3C, the first metal layer 121, the second metal layer 122, and the dielectric layer 130 are embedded in the membrane 110. In some embodiments, the membrane 110 may include polydimethylsiloxane (PDMS), phenolic epoxy resin (such as SU-8), polyimide (PI), or a combination thereof. In one embodiment, the membrane 110 is formed of PDMS, and the Young's modulus of the membrane 110 is between 1 MPa and 100 GPa. However, the present disclosure is not limited thereto. Compared with a film formed of polyimide, the membrane 110 formed of PDMS has a smaller Young's modulus and a softer film structure, which makes the membrane 110 have a larger displacement, thereby generates a larger sound amplitude.

Figure 3D:
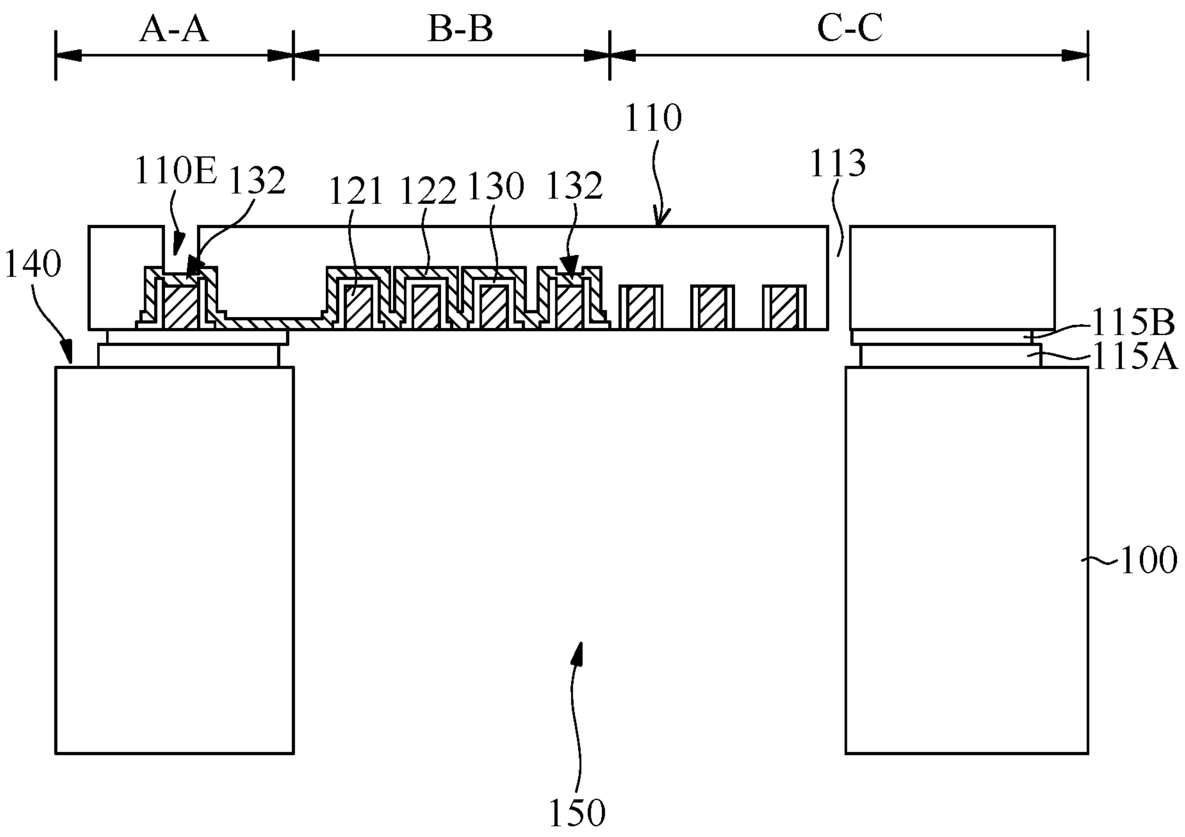

Referring to FIG. 3D, the membrane 110 is patterned to form an opening 110E in the membrane 110, forming a scribe line 140 is formed around the membrane 110. The opening 110E may expose the second metal layer 122. The first metal layer 121 is electrically connected to the second metal layer 122 in the opening 110E. The scribe line 140 may define an area of each package structure on the wafer. In this way, the scribe line 140 may facilitate cutting (for example, laser cutting) to separate the package structure. In some embodiments, the membrane 110 may be light-sensitive or not light-sensitive.

In some embodiments, the vent hole 113 is formed and communicates with the hollow chamber 150 during the formation of the scribe line 140. That is, the vent hole 113 may formed along with the scribe line 140. In some embodiments, the vent hole 113 may be formed during some other etching process. such as a singulation process, etc. Accordingly, additional process is not required for forming the vent hole 113, reducing the time and cost of manufacturing the package 10 of the speaker.

Still referring to FIG. 3D, a deep reactive-ion etching process or an etching process which applies an etchant (such as ammonium hydroxide ($NH_4OH$), hydrofluoric acid (HF), deionized water, tetramethylammonium hydroxide (TMAH), potassium hydroxide (KOH)) is performed on the substrate 100 to form a hollow chamber 150 in the substrate 100. As shown in FIG. 3D, the membrane 110 is disposed (for example, suspended) over the hollow chamber 150. It should be noted that the dielectric layers 115A and 115B may be used as etch stop layers to protect the membrane 110 and the multi-layered coil 120 from being etched. For example, the dielectric layers 115A and 115B may overlap at least a portion of the first metal layer 121 and the second metal layer 122, such as under the first metal layer 121 and the second metal layer 122. Since the etching rates of the dielectric layers 115A and 115B may be different, after the etching process, the dielectric layers 115A and 115B may not completely overlap. For example, the dielectric layer 115A may shrink to form a trough on the side facing the hollow chamber 150.

Figure 3E:
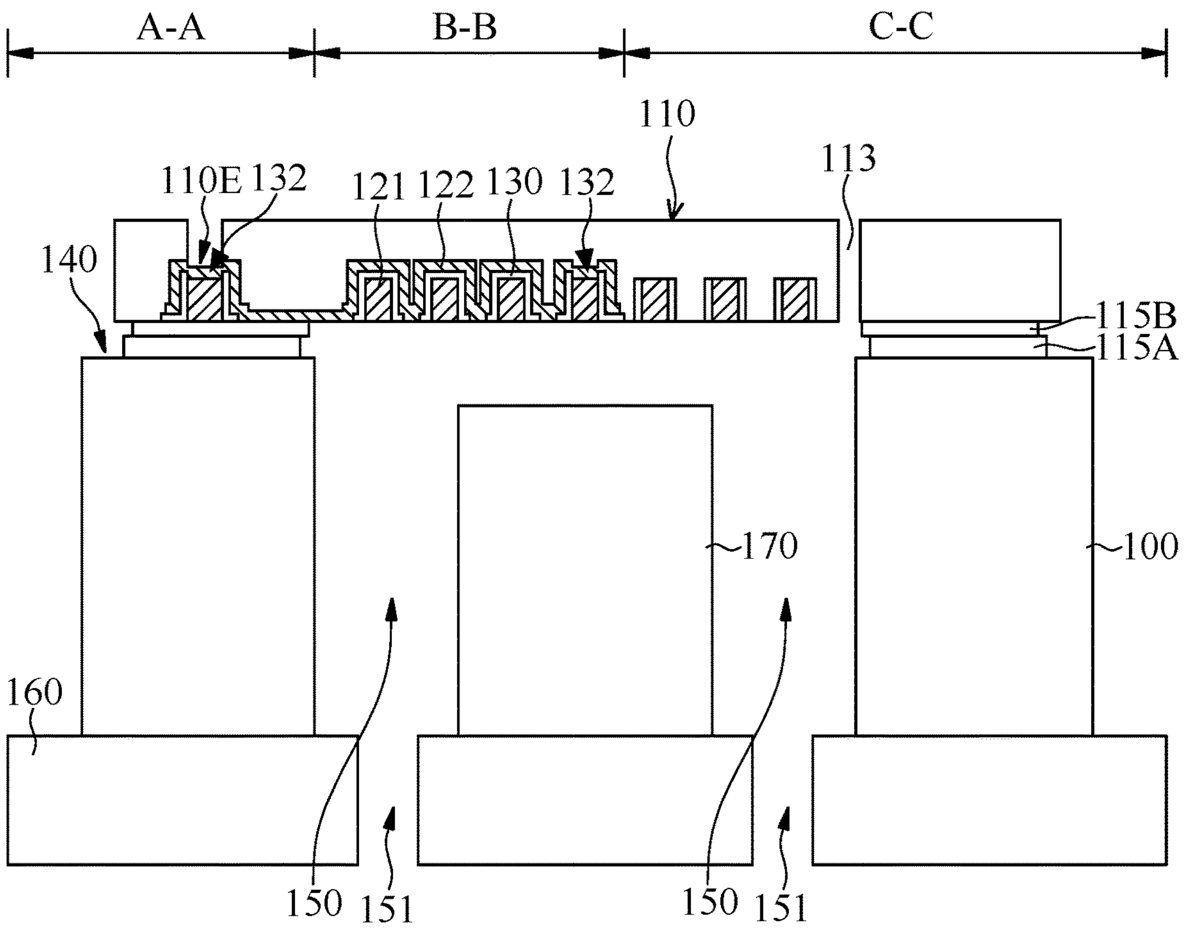

Referring to FIG. 3E, a carrier board 160 is disposed on the bottom surface of the substrate 100. In some embodiments, the carrier board 160 may include a printed circuit board (PCB). The carrier 160 board includes air holes 151 which allow the hollow chamber 150 to communicate with the external environment. The first permanent magnetic element 170 is disposed on the carrier board 160 and is accommodated in the hollow chamber 150. The first permanent magnetic element 170 is configured to cooperate with the multi-layered coil 120 to generate a force toward the normal direction of the substrate 100, and the membrane 110 can vibrate relative to the substrate 100 according to the force. In some embodiments, the first permanent magnetic element 170 may include a neodymium iron boron magnet.

Figure 3F:
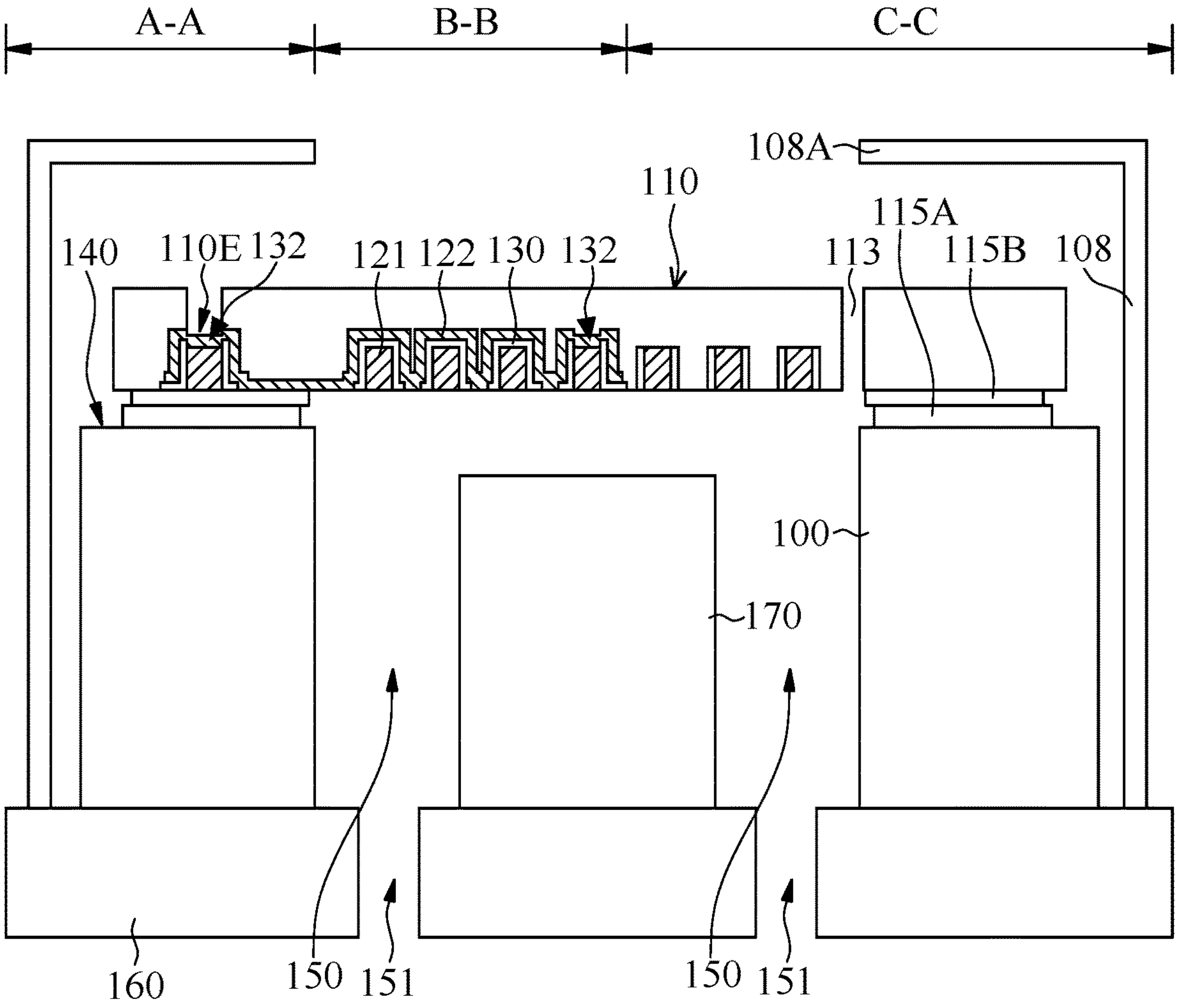

Referring to FIG. 3F, a lid 108 is disposed on the carrier board 160. The lid 108 wraps around the substrate 100 and the membrane 110, and the end 108A of the lid 108 exposes a portion of the top surface of the membrane 110. In some embodiments, the lid may include metals with lower magnetic permeability than $1.25\times10^{-4}$ H/mm, such as gold (Au), copper (Cu), aluminum (Al), or a combination thereof. In some embodiments, additional permanent magnetic element (not shown) may be disposed on the lid 108, and may be disposed above the membrane 102. As a result, the force generated by the current passing through the multi-layered coil 120 and the planar magnetic field in the normal direction of the substrate 100 is increased, so that the membrane 102 has a better frequency response, thereby improving the performance of the package structure.

Figure 4:
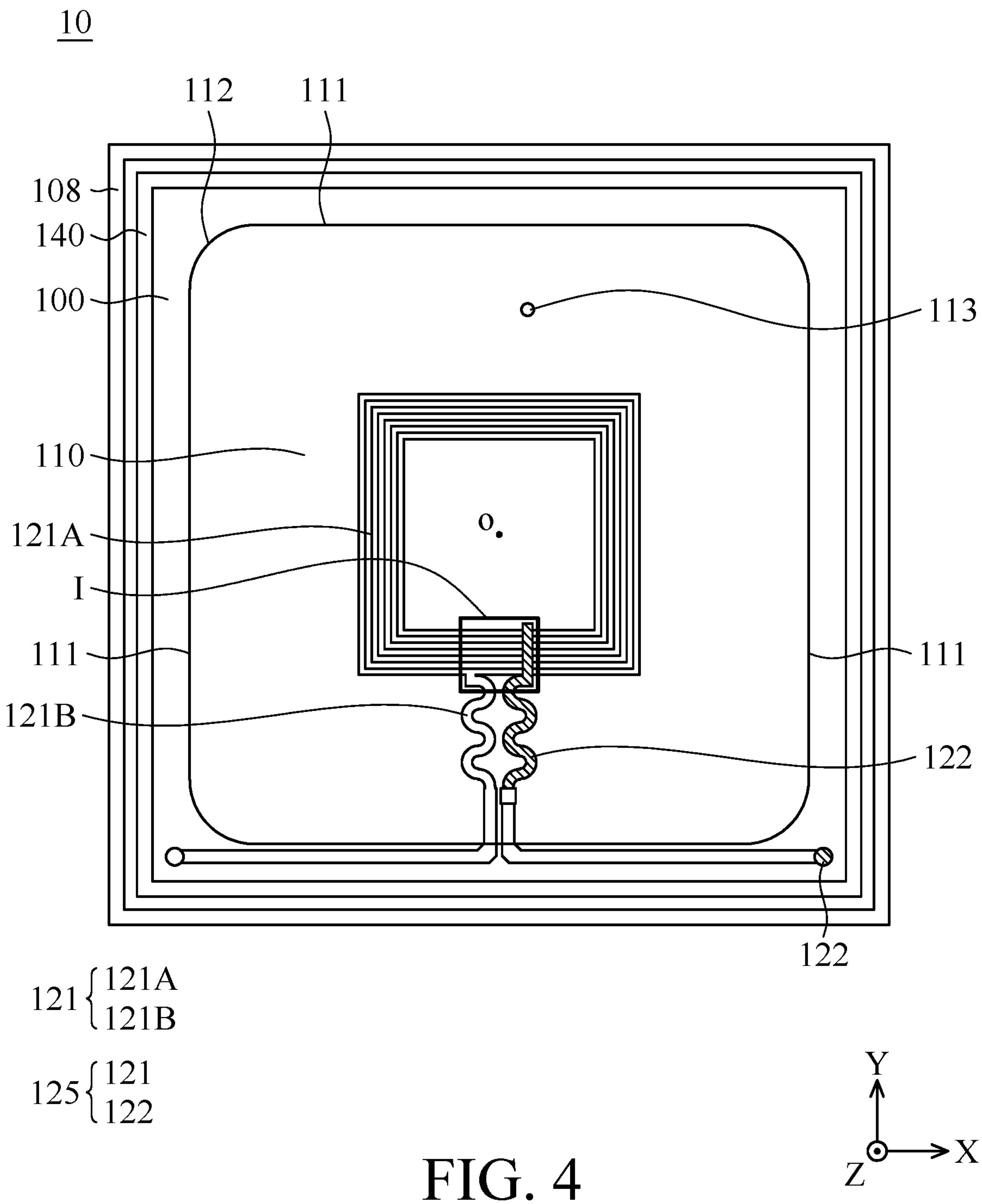
FIG. 4 is a schematic top view illustrating a package structure of a micro speaker in accordance with some embodiments of the present disclosure.

FIG. 4 is a schematic top view illustrating the package structure 10 of the micro speaker in accordance with some embodiments of the present disclosure. It should be note that the package structure 10 of the micro speaker in the present embodiment includes the same or similar elements as the package structure 10 of the micro speaker shown in FIG. 1. These same or similar elements are denoted by the same or similar numerals, and will not be discussed in detail as follows. For example, as shown in FIG. 4, the package structure 10 of the micro speaker includes a substrate 100, a membrane 110, a multi-layered coil 125, and a lid 108. The multi-layered coil 125 is disposed to be rectangular, corresponding to the profile of the membrane 110. To be more specific, the spiral structure 121A of the multi-layered coil

125 may have a rectangular profile, which is parallel to the edges 111 of the membrane 110. As a result, higher sound pressure level and better performance (for example, higher sensitivity) may be achieved.

Figure 5:
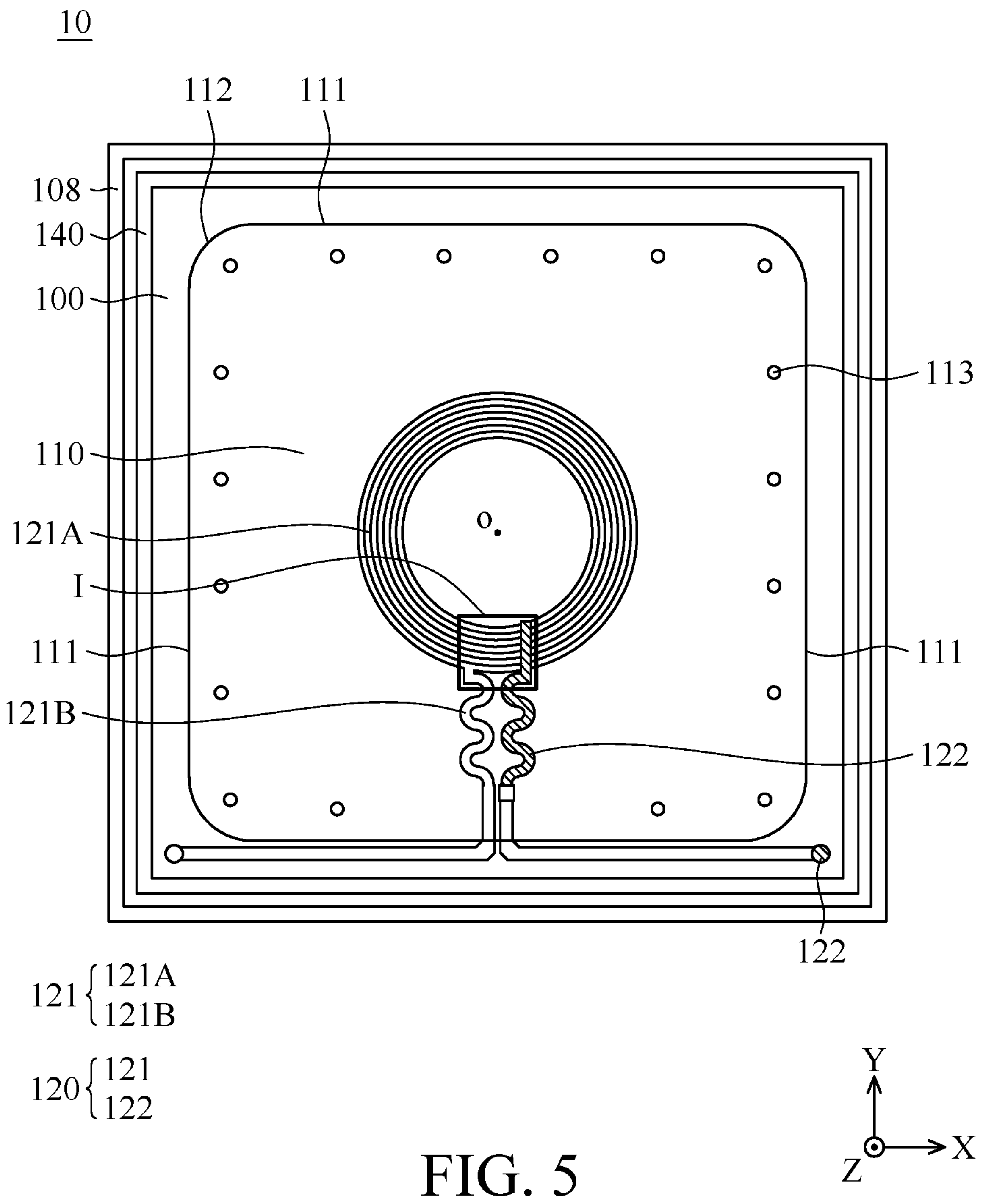
FIG. 5 is a schematic top view illustrating a package structure of a micro speaker in accordance with some embodiments of the present disclosure.

FIG. 5 is a schematic top view illustrating the package structure 10 of the micro speaker in accordance with some embodiments of the present disclosure. It should be note that the package structure 10 of the micro speaker in the present embodiment includes the same or similar elements as the package structure 10 of the micro speaker shown in FIG. 1. These same or similar elements are denoted by the same or similar numerals, and will not be discussed in detail as follows. For example, as shown in FIG. 5, the package structure 10 of the micro speaker includes a substrate 100, a membrane 110, a multi-layered coil 120, and a lid 108.

A plurality of vent holes 113 are formed in and penetrates the membrane 110. In some embodiments, the vent holes 113 are separated from the multi-layered coil 120 and arranged along the profile of the membrane 110 in a top view. The vent holes 113 may connect the front side of the membrane 110 and the back side of the membrane 110, and therefore the pressure of the two sides is balanced via the vent holes 113. Furthermore, multiple vent holes 113 may help to decrease the stiffness of the membrane 110, improving the sensitivity of the membrane 110, which relates to the performance (such as sound pressure level) of the micro speaker. In some other embodiments, the vent holes 113 may be arranged in the membrane 110 irregularly, and any possible arrangement of the vent holes 113 is included within the scope of the present disclosure.

Figure 6:
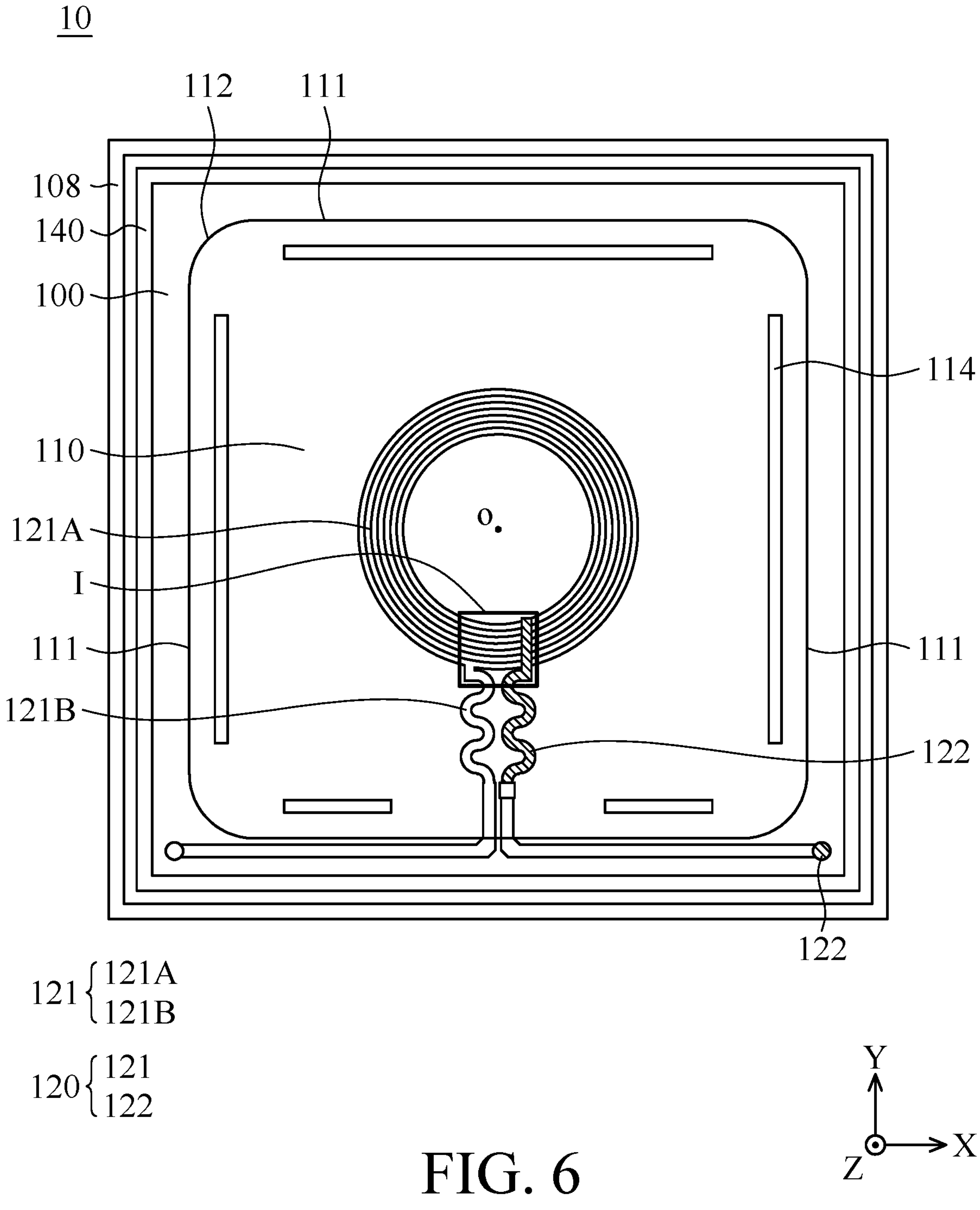
FIG. 6 is a schematic top view illustrating a package structure of a micro speaker in accordance with some embodiments of the present disclosure.

FIG. 6 is a schematic top view illustrating the package structure 10 of the micro speaker in accordance with some embodiments of the present disclosure. It should be note that the package structure 10 of the micro speaker in the present embodiment includes the same or similar elements as the package structure 10 of the micro speaker shown in FIG. 1. These same or similar elements are denoted by the same or similar numerals, and will not be discussed in detail as follows. For example, as shown in FIG. 6, the package structure 10 of the micro speaker includes a substrate 100, a membrane 110, a multi-layered coil 120, and a lid 108.

A plurality of vent holes 114 are formed in and penetrates the membrane 110. In some embodiments, the vent holes 114 are separated from the multi-layered coil 120 and arranged along the profile of the membrane 110 in a top view. The vent holes 114 may connect the front side of the membrane 110 and the back side of the membrane 110, and therefore the pressure of the two sides is balanced via the vent holes 114. In some embodiments, each of the vent holes 114 has an elongated shape, and therefore the vent holes 114 may be referred to as "vent slots" sometimes. Similarly, these vent holes 114 may help to decrease the stiffness of the membrane 110, improving the sensitivity of the membrane 110, which relates to the performance (such as sound pressure level) of the micro speaker. In some other embodiments, the elongated vent holes 114 may be arranged along with the circular vent holes 113 in the membrane 110 arbitrarily, and any possible arrangement of the vent holes 113 and 114 is included within the scope of the present disclosure.

Figure 7A:
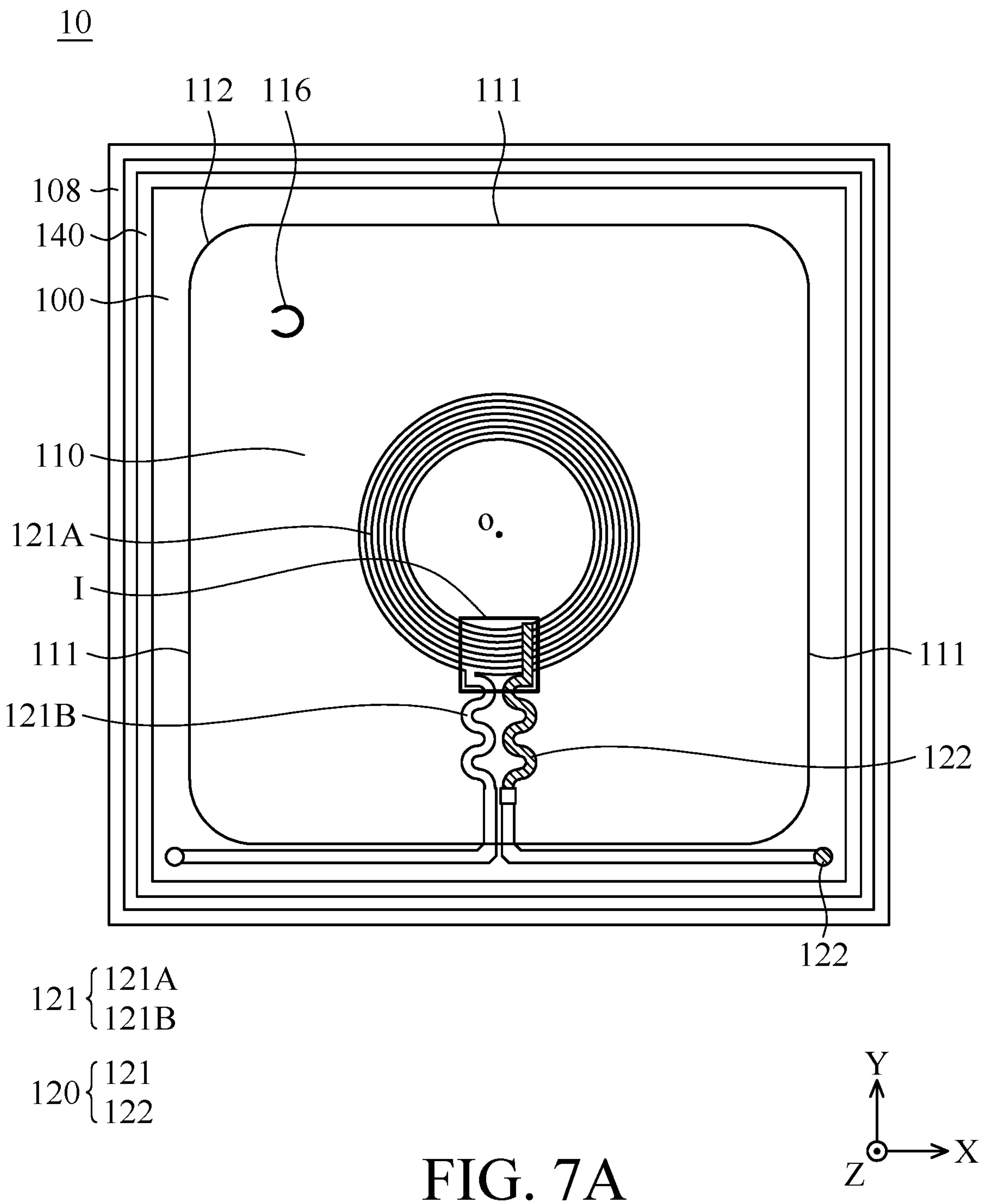
FIG. 7A is a schematic top view illustrating a package structure of a micro speaker in accordance with some embodiments of the present disclosure.
Figure 7B:
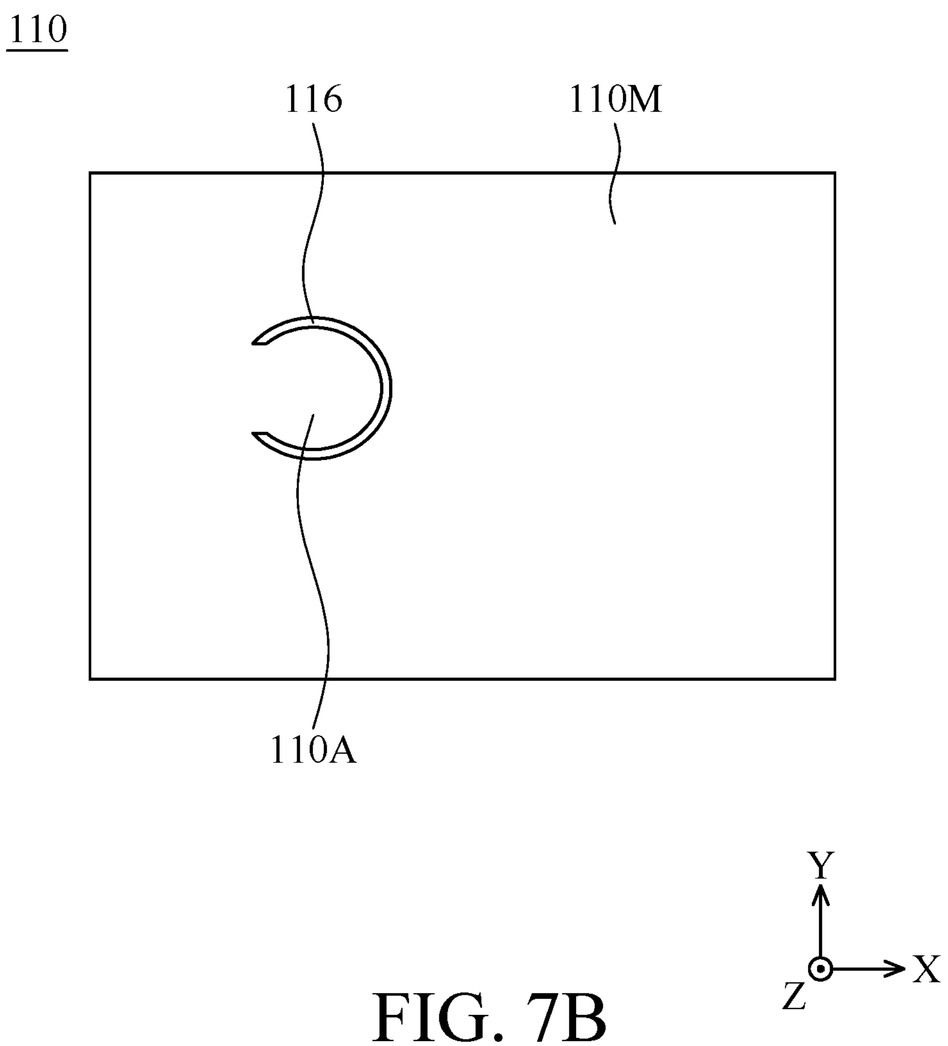
FIG. 7B is a schematic enlarged view illustrating the membrane shown in FIG. 7A in accordance with some embodiments of the present disclosure.

FIG. 7A is a schematic top view illustrating the package structure 10 of the micro speaker in accordance with some embodiments of the present disclosure. FIG. 7B is a schematic enlarged view illustrating the membrane 110 shown in FIG. 7A in accordance with some embodiments of the present disclosure. It should be note that the package structure 10 of the micro speaker in the present embodiment includes the same or similar elements as the package structure 10 of the micro speaker shown in FIG. 1. These same or similar elements are denoted by the same or similar numerals, and will not be discussed in detail as follows. For example, as shown in FIG. 7A, the package structure 10 of the micro speaker includes a substrate 100, a membrane 110, a multi-layered coil 120, and a lid 108.

A vent hole 116 is formed in and penetrates the membrane 110. In some embodiments, the vent hole 116 is separated from the multi-layered coil 120 in a top view. The vent hole 116 may connect the front side of the membrane 110 and the back side of the membrane 110, and therefore the pressure of the two sides is balanced via the vent hole 116.

In some embodiments, the vent hole 116 has a bow profile in the top view and divides the membrane 110 into a main body 110M and a vent portion 110A that is connected to the main body 110M. When the pressures are different on opposite sides of the membrane 110, airflow may pass through the vent hole 116 and push the vent portion 110A to move relative to the main body 110M, and the pressures may be balanced more rapidly. Otherwise, when the pressures are substantially the same on opposite sides of the membrane 110, the vent portion 110A may be substantially coplanar with the main body 110M. As such, the effective surface area of the membrane 110 may be obtained (including the vent portion 110A) for higher sensitivity.

Therefore, the vent hole 116 may be referred to as "dynamic vent hole" sometimes. Similarly, the vent hole 116 may help to decrease the stiffness of the membrane 110, improving the sensitivity of the membrane 110, which relates to the performance (such as sound pressure level) of the micro speaker. It is noted that although one vent hole 116 is shown in the present embodiments, more vent hole 116 may be provided regularly or irregularly in other embodiments, and these configurations are within the scope of the present disclosure.

Figure 8A:
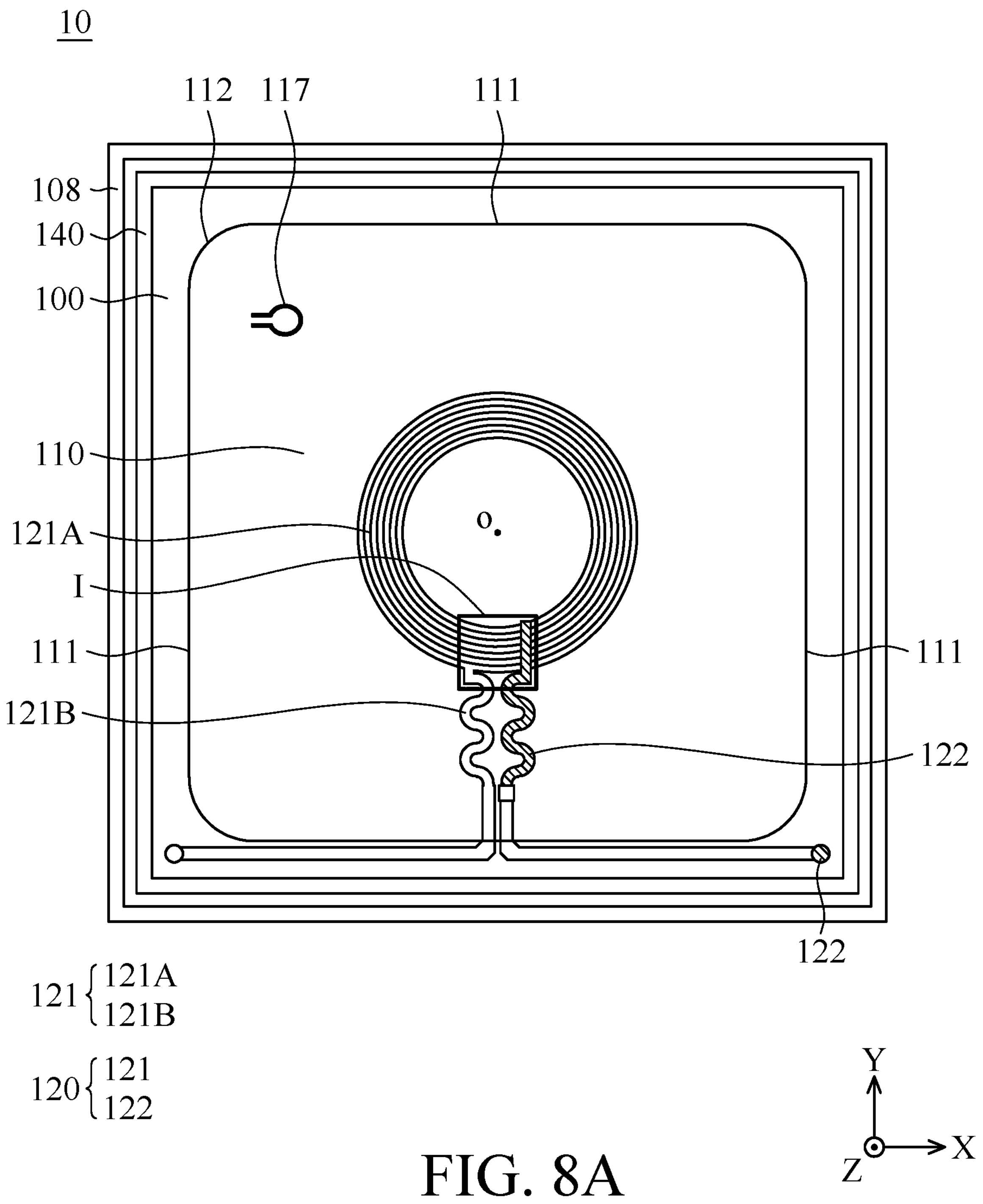
FIG. 8A is a schematic top view illustrating a package structure of a micro speaker in accordance with some embodiments of the present disclosure.
Figure 8B:
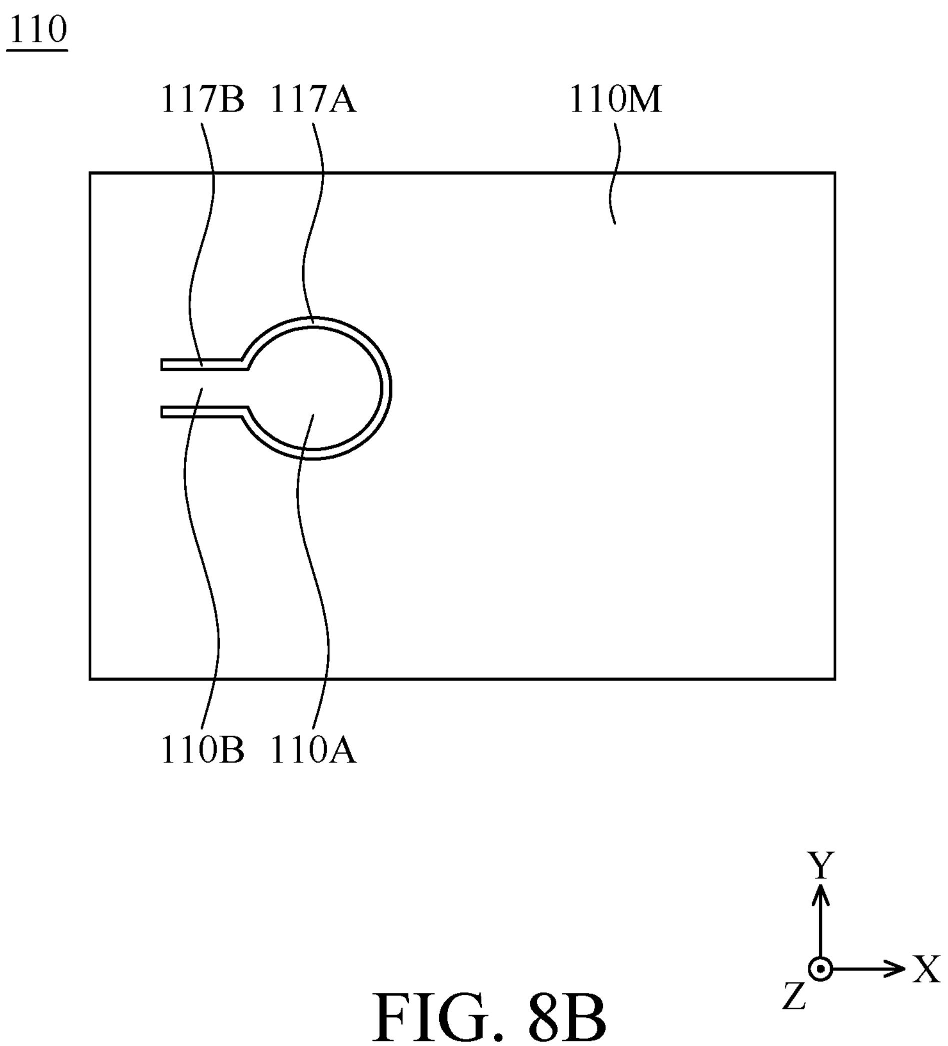
FIG. 8B is a schematic enlarged view illustrating the membrane shown in FIG. 8A in accordance with some embodiments of the present disclosure.

FIG. 8A is a schematic top view illustrating the package structure 10 of the micro speaker in accordance with some embodiments of the present disclosure. FIG. 8B is a schematic enlarged view illustrating the membrane 110 shown in FIG. 8A in accordance with some embodiments of the present disclosure. It should be note that the package structure 10 of the micro speaker in the present embodiment includes the same or similar elements as the package structure 10 of the micro speaker shown in FIG. 1. These same or similar elements are denoted by the same or similar numerals, and will not be discussed in detail as follows. For example, as shown in FIG. 8A, the package structure 10 of the micro speaker includes a substrate 100, a membrane 110, a multi-layered coil 120, and a lid 108.

A vent hole 117 is formed in and penetrates the membrane 110. In some embodiments, the vent hole 117 is separated from the multi-layered coil 120 in a top view. The vent hole 117 may connect the front side of the membrane 110 and the back side of the membrane 110, and therefore the pressure of the two sides is balanced via the vent hole 117.

In some embodiments, the vent hole 117 has a bow portion 117A and a linear portion 117B that is connected to the bow portion 117B. Correspondingly, the membrane 110 is divided into a main body 110M, a round portion 110A, and a linear portion 110B. The round portion 110A is connected to the main body 110M via the linear portion 110B. When the pressures are different on opposite sides of the membrane 110, airflow may pass through the vent hole 117 and push the round portion 110A and the linear portion 110B to move relative to the main body 110M, and the pressures may be balanced more rapidly. As such, the round portion 110A and the linear portion 110B may be referred to as "vent portion" for equalizing the pressure on opposite sides of the membrane 110. Otherwise, when the pressures are substantially the same on opposite sides of the membrane 110, the round portion 110A and the linear portion 110B may be substantially coplanar with the main body 110M. As such, the effective surface area of the membrane 110 may be obtained for higher sensitivity.

As described above, some embodiments of the present disclosure provide a package structure of a micro speaker including a membrane having a straight edge and/or a vent hole. In some embodiments, compared to conventional circular membrane, the disclosed membrane (such as having a shape of rounded rectangle) may have greater surface area under the same chip size, and therefore higher sound pressure level and better performance (for example, higher sensitivity) may be achieved. In addition, one or more vent hole are formed in the membrane for equalizing pressures of opposite sides of the membrane. Therefore, better user experience may be provided, and the reliability of the speaker may also be increased.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, manufacture, composition, devices, methods, and steps. Furthermore, each of the appended claims constructs an individual embodiment, and the scope of the present disclosure also includes every combination of the appended claims and embodiments.

What is claimed is:

1. A package structure of a micro speaker, comprising: a substrate having a hollow chamber; a membrane, disposed on the substrate, covering the hollow chamber;

a multi-layers coil includes a first metal layer and a second metal layer embedded in the membrane, wherein the coil comprises: a spiral structure located in a center of the membrane; and a wavy structure extending from the spiral structure to a periphery of the membrane; and a magnetic element disposed in the hollow chamber, wherein a vent hole is formed in and penetrates the membrane, and in a top view, the vent hole is separated from the coil, located on a side opposite to the wavy structure, and is in fluid communication with and is aligned communicates with and overlaps with the hollow chamber.

2. The package structure of the micro speaker as claimed in claim 1, wherein the vent hole has a bow profile in the top view and divides the membrane into a main body and a vent portion connected to the main body.

3. The package structure of the micro speaker as claimed in claim 2, wherein the vent hole has a bow portion and a linear portion connected to the bow portion.

4. The package structure of the micro speaker as claimed in claim 3, wherein the vent portion of the membrane comprises a round portion and a linear portion connected to the round portion.

5. The package structure of the micro speaker as claimed in claim 2, wherein the vent portion is movable relative to the main body.

6. The package structure of the micro speaker as claimed in claim 1, further comprising:

a carrier board bonded to the substrate, wherein the magnetic element is disposed on the carrier board.

7. The package structure of the micro speaker as claimed in claim 1, wherein a plurality of vent holes are formed in the membrane and arranged parallel to an edge of the membrane.

8. The package structure of the micro speaker as claimed in claim 1, wherein the vent hole has an elongated shape.

9. The package structure of the micro speaker as claimed in claim 1, wherein a diameter of the vent hole is between 1 μm and 100 μm.

10. A package structure of a micro speaker, comprising: a substrate having a hollow chamber; a membrane, disposed on the substrate, covering the hollow chamber, wherein the membrane has at least one straight edge;

a multi-layers coil includes a first metal layer and a second metal layer embedded in the membrane, wherein the coil comprises: a spiral structure located in a center of the membrane; and a wavy structure extending from the spiral structure to a periphery of the membrane; and a magnetic element disposed in the hollow chamber, wherein a vent hole is formed in and penetrates the membrane, and in a top view, the vent hole is separated from the coil, located on a side opposite to the wavy structure, and is aligned overlaps with the hollow chamber.

11. The package structure of the micro speaker as claimed in claim 10, wherein the membrane has a rectangular shape with rounded corners.

12. The package structure of the micro speaker as claimed in claim 10, wherein the straight edge of the membrane is parallel to an edge of the substrate.

13. A package structure of a micro speaker, comprising: a substrate having a hollow chamber; a membrane, disposed on the substrate, covering the hollow chamber, wherein the membrane has at least one straight edge;

a multi-layers coil includes a first metal layer and a second metal layer embedded in the membrane, wherein the coil comprises: a spiral structure located in a center of the membrane; and a wavy structure extending from the spiral structure to a periphery of the membrane; and a magnetic element disposed in the hollow chamber, wherein a vent hole is formed in and penetrates the membrane, and in a top view, the vent hole is separated from the coil, located on a side opposite to the wavy structure, and is in fluid communication with and is aligned communicates with the hollow chamber.

14. The package structure of the micro speaker as claimed in claim 13, wherein the straight edge of the membrane is parallel to an edge of the substrate.

15. The package structure of the micro speaker as claimed in claim 13, wherein the vent hole has a bow profile in the top view and divides the membrane into a main body and a vent portion connected to the main body.

16. The package structure of the micro speaker as claimed in claim 15, wherein the vent hole has a bow portion and a linear portion connected to the bow portion.

17. The package structure of the micro speaker as claimed in claim 15, wherein the vent portion of the membrane comprises a round portion and a linear portion connected to the round portion.

18. The package structure of the micro speaker as claimed in claim 13, wherein a plurality of vent holes are formed in the membrane and arranged parallel to the edge of the membrane.

19. The package structure of the micro speaker as claimed in claim 13, wherein the vent hole has an elongated shape.

20. The package structure of the micro speaker as claimed in claim 13, wherein a diameter of the vent hole is between 1 μm and 100 μm.

* * * * *